(12) United States Patent
Harrison et al.

(10) Patent No.: US 9,143,031 B2
(45) Date of Patent: Sep. 22, 2015

(54) POWER FACTOR CONTROL OF A CYCLO-CONVERTER

(75) Inventors: Michael John Harrison, Christchurch (NZ); Huaqiang Li, Mendham, NJ (US); Yakov Familiant, Milwaukee, WI (US)

(73) Assignee: Eaton Industries Company, Christchurch (NZ)

( * ) Notice: Subject to any disclaimer, the term of this patent is extended or adjusted under 35 U.S.C. 154(b) by 308 days.

(21) Appl. No.: 13/805,433

(22) PCT Filed: Jun. 15, 2011

(86) PCT No.: PCT/NZ2011/000109
§ 371 (c)(1),
(2), (4) Date: Apr. 16, 2013

(87) PCT Pub. No.: WO2012/005604
PCT Pub. Date: Jan. 12, 2012

(65) Prior Publication Data
US 2013/0201738 A1     Aug. 8, 2013

(30) Foreign Application Priority Data
Jun. 29, 2010   (NZ) ........................................ 586493

(51) Int. Cl.
*H02M 1/42*     (2007.01)
*H02M 5/293*    (2006.01)
(Continued)

(52) U.S. Cl.
CPC ............ *H02M 1/425* (2013.01); *H02M 1/4216* (2013.01); *H02M 1/4241* (2013.01);
(Continued)

(58) Field of Classification Search
CPC . H02M 1/4216; H02M 1/4241; H02M 1/425; H02M 1/4258; H02M 5/22; H02M 5/275; H02M 5/293; H02M 2005/2932; H02M 7/217
USPC ........... 323/207, 910; 363/21.02, 81, 89, 148, 363/149, 163, 164
See application file for complete search history.

(56) References Cited

U.S. PATENT DOCUMENTS 5,187,427 A * 2/1993 Erdman ........................ 323/207
5,329,439 A   7/1994 Borojevic et al.
(Continued)

FOREIGN PATENT DOCUMENTS

WO   WO 2008018802 A2 * 2/2008 .............. H02M 1/42

OTHER PUBLICATIONS

Garcia-Gil J .M. et al., "Bi-directional Three-Phase Rectifier with High-Frequency Isolation and Power Factor Correction", *35th Annual IEEE Power Electronics Specialists Conference*, vol. 4, pp. 2869-2874, Aachen, Germany, 2004.
(Continued)

*Primary Examiner* — Fred E Finch, III
(74) *Attorney, Agent, or Firm* — Myers Bigel Sibley & Sajovec, P.A.

(57) ABSTRACT

A three-phase resonant cyclo-converter comprising a power control module, wherein the power control module is arranged to develop a plurality of repeating switching periods within a cycle, the power control module further arranged to: control the length of a first switching period in the cycle to adjust the power flow, and control the relative length of two or more further switching periods in the cycle to adjust the power factor, wherein the relative length is controlled based on a cross-product of voltage and current values associated with the further switching periods.

37 Claims, 8 Drawing Sheets

(51) Int. Cl.
H02M 7/217 (2006.01)
H02M 5/27 (2006.01)

(52) U.S. Cl.
CPC ............ *H02M1/4258* (2013.01); *H02M 5/271* (2013.01); *H02M 5/293* (2013.01); *H02M 7/217* (2013.01); *Y02B 70/126* (2013.01)

(56) References Cited

U.S. PATENT DOCUMENTS

| | | | | |
|---|---|---|---|---|
| 7,701,740 | B2* | 4/2010 | Yamanaka | 363/149 |
| 8,885,377 | B2* | 11/2014 | Yamamoto | 363/148 |
| 2002/0093840 | A1* | 7/2002 | Lacaze et al. | 363/152 |
| 2004/0145334 | A1* | 7/2004 | Virtanen | 318/712 |
| 2006/0262576 | A1* | 11/2006 | Przybyla et al. | 363/21.02 |
| 2007/0159121 | A1* | 7/2007 | Maikawa et al. | 318/140 |
| 2009/0257261 | A1* | 10/2009 | Sakakibara | 363/164 |
| 2009/0285002 | A1* | 11/2009 | Benesch et al. | 363/127 |
| 2009/0323380 | A1* | 12/2009 | Harrison | 363/126 |
| 2011/0313591 | A1* | 12/2011 | Andresen et al. | 700/298 |

OTHER PUBLICATIONS

Hiti S. et al., "A New Control Algorithm for Three-Phase PWM buck Rectifier with Input Displacement Factor Compensation", *IEEE Transactions on Power Electronics*, vol. 9, No. 2, Mar. 1994, pp. 173-180.

Huisman H., "A Multiphase Series-Resonant Converter with a New Topology and a Reduced Number of Thyristors", *IEEE Transactions on Power Electronics*, vol. 10, No. 1, Jan. 1995, pp. 86-93.

International Search Report Corresponding to International Application No. PCT/NZ2011/000109; Date of Mailing: Apr. 26, 2012; 4 pages.

Karlsson M. et al., "A novel approach to the design of three-phase AC/DC power converters with unity power factor", *Proc. Intelec.*, 1999, Copenhagen, Paper 5-1.

Lander Cyril, "Frequency Conversion", *Power Electronics*, McGraw-Hill, GB 1993, pp. 181-191.

Manias S. et al., "A Novel Sinewave in AC to DC Converter with High-Frequency Transformer Isolation", *IEEE Transactions on Industrial Electronics*, vol. IE-32, No. 4, Nov. 1985, 430-438.

Vlatkovic V. et al., "A Zero-voltage Switched, Three-Phase Isolated PWM Buck Rectifier", *IEEE Transactions on Power Electronics*, vol. 10, No. 2, Mar. 1995, pp. 148-157.

Vlatkovic V. et al., "Analysis and Design of a Zero-Voltage Switched, Three-Phase PWM Rectifier With Power Factor Correction", *23rd Annual IEEE Power Electronics Specialists Conference*, vol. 2, pp. 1352-1360, Jun. 29-Jul. 3, 1992.

\* cited by examiner

POWER FACTOR CONTROL OF A CYCLO-CONVERTER

RELATED APPLICATIONS

The present application is a 35 U.S.C. §371 national phase application of PCT International Application No. PCT/NZ2011/000109, having an international filing date of Jun. 15, 2011, claiming priority to New Zealand Patent Application No. 586493, filed Jun. 29, 2010. The disclosures of each application are incorporated herein by reference in their entireties. The above PCT International Application was published in the English language and has International Publication No. WO 2012/005604.

FIELD OF THE INVENTION

The present invention relates to the power factor control of a cyclo-converter. In particular, the present invention relates to a three-phase resonant cyclo-converter and a method of controlling a three-phase resonant cyclo-converter that includes power factor control.

BACKGROUND

Many different industries require power supplies for supplying constant power based on a three-phase power source.

Cyclo-converters have been developed for use in efficient power supplies in order to provide a number of improvements over conventional rectifier power supplies and two stage power supplies.

A cyclo-converter provides an efficient single stage power converter. A benefit of adopting single stage power conversion is based on the fact that a single stage converter will have an efficiency similar to the efficiency of either of the individual stages of a conventional two-stage rectifier (e.g. 96%). In other words the losses from a single-stage converter are only half of that of a two-stage converter. This greater efficiency (lower losses) leads to a corresponding decrease in the size of components within the rectifier and hence a smaller product that costs less to produce. Other benefits are obtained by virtue that the exhaust air heat from the converter will be lower for a given system power (easing power system design) and in the fact that a single-stage converter can be realised with considerably fewer components than a conventional two-stage rectifier design.

The present applicants have developed a unique three-phase resonant cyclo-converter configuration as described in PCT publication WO2008/018802, which is hereby incorporated by reference.

This present application relates to an improved method (and associated control system) for controlling the power transfer and power factor of a three-phase resonant cyclo-converter, such as the type described in WO2008/018802. It will be appreciated that although power converters such as those described in WO2008/018802 are particularly useful in the telecommunication industry that they may also equally be applicable in other industries.

Embodiments of the present invention provide an improved mechanism for controlling the power transfer and the power factor of a three phase resonant cyclo-converter.

An object of the present invention is to provide improved control over existing three-phase resonant cyclo-converters.

A further object of the present invention is to provide improved control of the power transfer function of a three-phase resonant cyclo-converter.

A further object of the present invention is to provide improved control of the power factor of a three-phase resonant cyclo-converter.

Each object is to be read disjunctively with the object of at least providing the public with a useful choice.

The present invention aims to overcome, or at least alleviate, some or all of the afore-mentioned problems.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

According to one aspect, the present invention provides a three-phase resonant cyclo-converter comprising a power control module, wherein the power control module is arranged to develop a plurality of repeating switching periods within a cycle, the power control module further arranged to: control the length of a first switching period in the cycle to adjust the power flow, and control the relative length of two or more further switching periods in the cycle to adjust the power factor, wherein the relative length is controlled based on a cross-product of voltage and current values associated with the further switching periods.

According to a further aspect, the present invention provides a method of developing a plurality of repeating switching periods within a cycle to control a three-phase resonant cyclo-converter, the method comprising the steps of: controlling the length of a first switching period in the cycle to adjust the power flow, and controlling the relative length of two or more further switching periods in the cycle to adjust the power factor, wherein the relative length is controlled based on a cross-product of voltage and current values associated with the further switching periods.

According to particular embodiments of the present invention an improved control mechanism for three phase resonant cyclo-converters is provided.

BRIEF DESCRIPTION OF THE DRAWINGS

Embodiments of the present invention will now be described, by way of example only, with reference to the accompanying drawings, in which.

DETAILED DESCRIPTION OF THE INVENTION

First Embodiment

According to various embodiments of the present invention, a method for controlling the power transfer and power factor of a cyclo-converter is described. The described method may be implemented in a three phase resonant cyclo-converter and is used to control the switching periods of a switching sequence implemented in such a cyclo-converter.

The cyclo-converter circuit arrangement will now be described with reference to FIG. 1.

Figure 1:
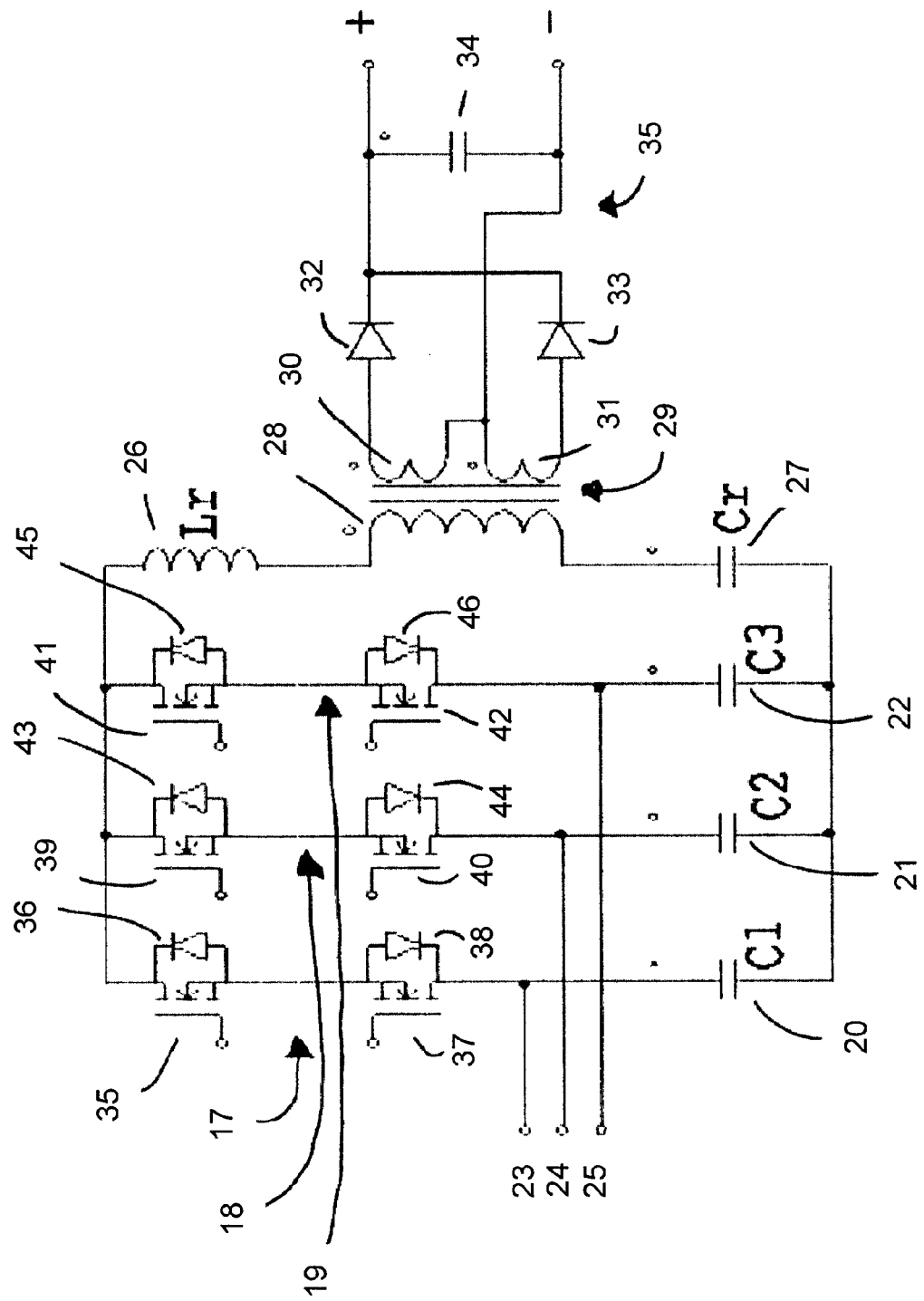
FIG. 1 shows a known three phase resonant cyclo-converter circuit which is controlled according to an embodiment of the present invention.

FIG. 1 shows a three phase resonant cyclo-converter circuit in the form of a half bridge which uses a control method according to this first embodiment.

It will be understood that this embodiment and other embodiments of the present invention may also be applied to a full bridge cyclo-converter.

The cyclo-converter of FIG. 1 includes bidirectional switches 17 to 19 and capacitors 20 to 22 forming the half bridge. Switch 17 consists of MOSFET 35 in parallel with body diode 36 in series with MOSFET 37 in parallel with body diode 38. Switch 17 has four states:
  1. on (MOSFETs 35 and MOSFET 37 on);
  2. off (MOSFET's 35 and 37 off)
  3. forward diode (MOSFET 37 on switching in body diode 36)
  4. reverse diode (MOSFET 35 on switching in body diode 38)

Switches 18 and 19 are similarly configured. By utilizing the four switching states full resonant switching can be achieved as will be described.

Three phase supply lines 23 to 25 provide a three phase AC supply to the half bridge. The output of the cyclo-converter drives an LLC resonant circuit consisting of inductor 26, capacitor 27 and primary coil 28 of transformer 29. Output coils 30 and 31 are connected via diodes 32 and 33 and capacitor 34 to form half bridge rectifier 35.

Inductor 26 and capacitor 27 form the series-resonant circuit. To achieve low load output voltage regulation the resonant circuit can be easily transformed from a simple LC resonant circuit into an LLC resonant circuit by gapping the core of the main transformer 29. The primary method of output voltage control is achieved by variable frequency control.

The switching sequence of a three phase resonant cyclo-converter will now be described with reference to FIG. 2.

According to this embodiment, the switching frequency of the cyclo-converter is a high frequency. That is, the switching frequency for this embodiment is approximately 100 kHz. However, it will be understood that, as an alternative, other lower or higher switching frequencies may be used.

To achieve the requirements to enable resonant switching the transistors are always sequenced in the order that results in the largest voltage magnitude (L) mains phase transistor being switched on first, followed by the mains phase that has the medium voltage magnitude (M), then finally the mains phase with the smallest mains voltage magnitude (S). This sequencing is repeated indefinitely (L, M, S, L, M, S, . . . ) with a sub-microsecond dead-time to allow for the resonant load voltage commutation. Since the mains instantaneous input voltages are continually changing the sequencing logic responsible for driving the individual transistors reverses the transistor sequencing order every 30 degrees of mains input.

Figure 2:
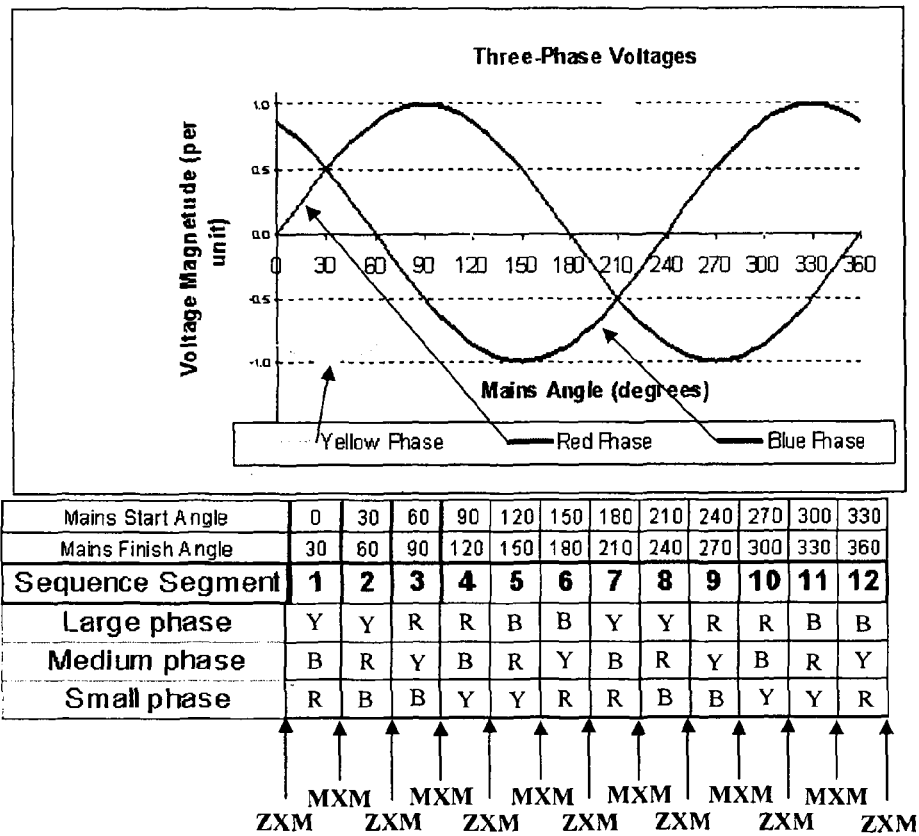
FIG. 2 shows a switching sequence of a three phase resonant cyclo-converter which is controlled according to an embodiment of the present invention.

FIG. 2 shows the three phase mains instantaneous voltages (Yellow, Blue and Red) over a single mains cycle and the table immediately below the graph shows a logic table that signifies the function of each of the six transistors during each of the 12 mains 30-degree segments:

"Large phase (L)"—The transistor that is controlling the flow of current from the mains phase with the largest voltage magnitude through to the resonant load, transformer, and ultimately the output of the rectifier.

"Medium phase (M)"—The transistor that is controlling the flow of current from the mains phase with the medium voltage magnitude through to the resonant load, transformer, and ultimately the output of the rectifier.

"Small phase (S)"—The transistor that is controlling the flow of current from the mains phase with the smallest voltage magnitude through to the resonant load, transformer, and ultimately the output of the rectifier.

The references Y, B and R in the logic table indicate which of the three mains phase instantaneous voltages Yellow, Blue or Red are the relevant voltage for the indicated phase (L, M or S).

This resonant switching sequence results in sine-wave current flow through the transistors and output rectifier diodes, such that the current has almost returned to zero when each switching transition occurs. This reduces the switching losses in both the transistors and output diodes and allows for either MOSFET or IGBT switching transistors to be used. If IGBT transistors are used anti-parallel diodes may be employed to allow a reverse current path (emitter to collector).

A brief discussion of the various modes of the cyclo-converter is now provided. In FIG. 2, ZXM indicates the position where the zero-cross mode is activated and MXM indicates the position where the magnitude-cross mode is activated, as described below.

Since it becomes impractical to try and turn a transistor on then off again in an extremely small time period, there comes a point (near each mains voltage zero crossing) where there is no benefit in trying to turn the S transistor on. Hence for a period that starts a few degrees before each mains zero crossing and extends to a few degrees after the mains zero crossing the cyclo-converter may operate in a two-phase mode. This mode is referred to as a "zero-cross mode" and during this mode of operation the high frequency switching sequence is simply L, M, L, M, L, M . . . —where only the L and M transistors are switched on and the S transistor remains off. During this "zero-cross mode" the transistor on-times for both the L and the M transistor are equal.

A different issue arises in maintaining the normal L, M, S, L, M, S . . . high frequency switching sequence at the mains voltage magnitude crossing point. At every mains magnitude cross point the M and S phase voltages swap over and hence the definitions of M and S must also swap. If the rate of change of the mains phase voltages is considered with respect to the high frequency switching frequency of the cyclo-converter it becomes clear that the concept of the M and S phase voltages crossing over at a particular instance in time is far from the reality. The rate of change of the mains phase voltages is so slow that for many high frequency switching cycles the M and the S phase voltages are effectively equal. What's more, when real world effects like noise are considered it can also be appreciated that the converter may actually operate for several high frequency switching cycles with incorrect M and S definitions. For example, the voltage on the phase we are calling S is actually greater (by a very small amount) than the voltage on the phase we are calling M. This error in the definition of the M and S phases causes the wrong transistor switching sequence which in turn leads to considerable current flowing from M to S mains phase (or S to M mains phase depending on relative voltage polarities. By changing the high frequency switching sequence used when the cyclo-converter is operating near to a mains voltage magnitude cross point this problem may be avoided.

Therefore, for a period that starts a few degrees before each mains magnitude crossing and extends to a few degrees after the mains magnitude crossing the cyclo-converter may operate in an interleaved mode. This mode is referred to as a "magnitude-cross mode" and during this mode the high frequency switching sequence is simply L, M, L, S, L, M, L, S, . . . —where the M and S transistors are alternately switched on between each time the L transistor is switched on. During this "magnitude-cross mode" the transistor on-times for the L, M, and S transistors are all equal.

Thus the cyclo-converter uses three different high frequency switching sequences: "zero-cross mode"—used near to mains phase zero crossings "Three-phase mode"—the normal mode used the majority of the time "magnitude-cross mode"—used near to mains phase magnitude crossings.

Figure 3:
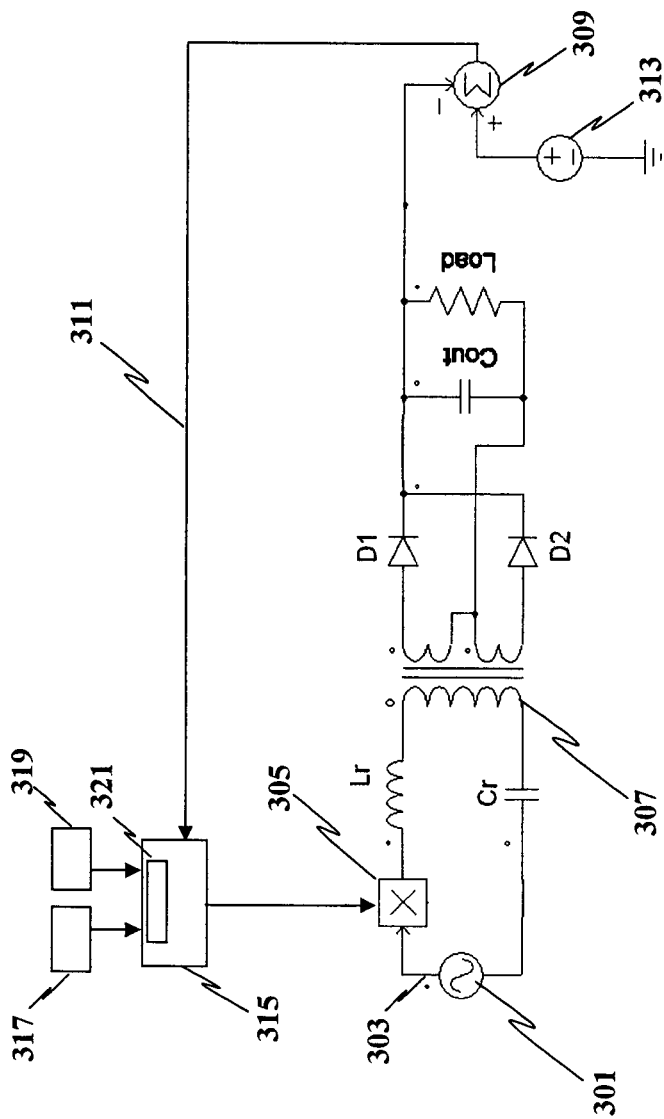
FIG. 3 shows a block diagram of a control circuit according to an embodiment of the present invention.

FIG. 3 shows a system block diagram of various components that are arranged to provide the power transfer and power factor control mechanism.

A three phase power supply input 301 supplies three input phase voltage signals Va, Vb and Vc 303 to the cyclo-converter 305. The cyclo-converter has been identified in this diagram as a block box, however it will be understood that in this embodiment the cyclo-converter is as shown in FIG. 1. The output of the cyclo-converter is the LLC resonant circuit consisting of the resonant inductor Lr, the primary coil 307 of the output transformer, and the resonant capacitor Cr.

The output voltage from the half bridge rectifier formed by D1 & D2 is monitored and fed into a voltage error signal module 309 to develop an error signal 311 based on the difference between the output voltage from the half bridge rectifier and a reference voltage 313.

The error signal is fed into a power control module 315, which is arranged to adjust the switching period of the cyclo-converter as described in more detail below.

A voltage development module 317 is also provided that is arranged to develop voltage waveforms that are based on the input phase voltage signals, as will be explained in more detail below.

A current synthesizer module 319 is also provided that is arranged to synthesize current waveforms based on the resonant current of the cyclo-converter during switching periods of the input phase voltage signals, as will be explained in more detail below.

The voltage development module 317 and current synthesizer module 319 output signals are fed into a power factor control module 321 that is arranged to adjust the switching periods of the cyclo-converter based on a cross product of the output signals in order to adjust the power factor of the cyclo-converter.

One important aim of a cyclo-converter is to ensure that there is good power transfer to enable the load attached to the output of the cyclo-converter to have sufficient supply of power. To do this, the control circuitry controlling the cyclo-converter is required to adjust the operation of the cyclo-converter so that it operates in a region of its transfer characteristics that enable it to produce the required power.

Figure 4:
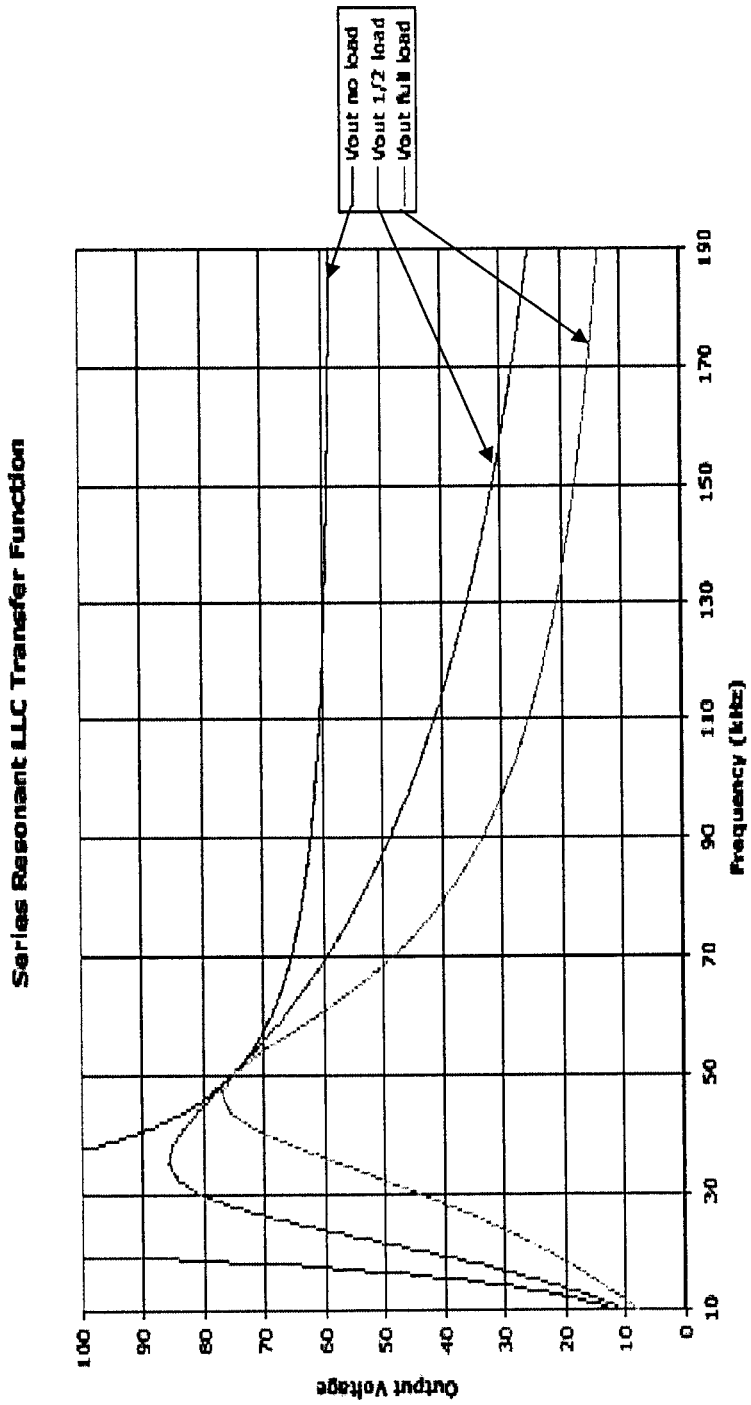
FIG. 4 shows transfer characteristics of a cyclo-converter as controlled according to an embodiment of the present invention.

FIG. 4 shows the series resonant LLC transfer function for a cyclo-converter of the type described herein. The x-axis shows the switching frequency of the cyclo-converter and the y-axis shows the output voltage of the cyclo-converter. Three characteristics are shown where the cyclo-converter has no load, a half load and a full load. As explained above, in this embodiment the cyclo-converter is operating at a switching frequency of 100 kHz. It can be seen from the transfer function that by increasing the switching frequency above 100 kHz the output voltage drops, and by reducing the switching frequency the output voltage increases.

Therefore, by monitoring the output voltage of the cyclo-converter with reference to a desired voltage, the control system can determine whether the switching frequency should be increased or reduced to maintain the desired voltage and so ensure sufficient power is flowing through the cyclo-converter. That is, by adjusting the switching frequency the cyclo-converter LLC circuit starts to operate in a different portion of the transfer characteristics and so the output voltage changes.

In order to adjust the power transfer or flow, the on time of the L cycle (i.e. the L on period) is adjusted based on the voltage error signal 311 developed from the measured voltage on the output of the half bridge rectifier. The adjusted L period is used to change the overall switching frequency period and thus the switching frequency of the cyclo-converter.

Figure 5A:
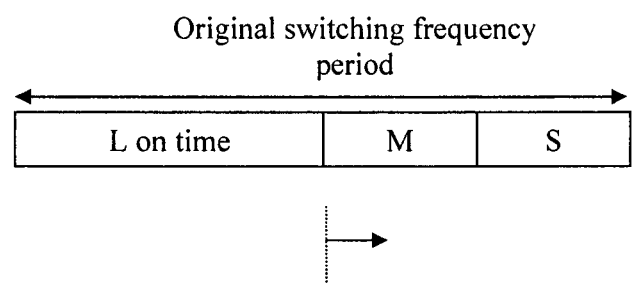
FIGS. 5A and 5B show switching period adjustments according to an embodiment of the present invention.
Figure 5B:
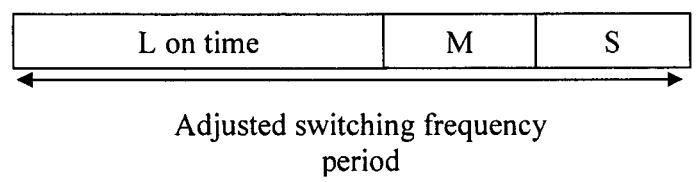

Referring to FIGS. 5a and 5b, a depiction of the L, M and S switching periods for a single switching frequency period is provided.

FIG. 5a depicts the original three switching periods for L, M and S for an unadjusted switching frequency period. A first switching period L determines the on time for the transistors in the cyclo-converter that will switch the largest magnitude input phase voltage signal. That is, the three input phase voltage signals Va, Vb and Vc forming the three-phase voltage power supply input are switched depending on their magnitude by the various transistor pairs as shown in FIG. 1. Switching period L indicates the largest magnitude input phase voltage signal is being switched, switching period M indicates the medium magnitude input phase voltage signal is being switched and switching period S indicates the smallest magnitude input phase voltage signal is being switched.

From FIGS. 5A and 5B, it can be seen that L is switched on for 50% of the time, while M and S share the remaining 50%. That is, the largest magnitude input phase voltage signal is switched through to the LLC circuit for 50% of the switching period, while the medium and small magnitude input phase voltage signals are switched through to the LLC circuit for the remaining 50% of the switching period.

If the control circuitry detects that the output voltage of the cyclo-converter has dropped below the desired voltage, an error signal is produced. This error signal is used to increase the L switching period as shown in FIG. 5b. This reduces the switching frequency, which increases the output voltage when operating at a frequency which is above the resonance frequency, i.e. when the cyclo-converter is operating "above resonance".

Likewise, if the output voltage rises above the desired voltage, the error signal produced reduces the L switching period and so increases the switching frequency to reduce the output voltage.

In each case, the error signal 311 is fed into the voltage control loop within the power control module 315. According to this embodiment, the control loop is a Proportional Integral Derivative (PID) controller. Separate P, I, & D gain terms are used to create a P, I and D output. These three terms are added together to form the control output that adjusts the L on time. The control output is based on the switching "frequency". As explained above, according to this embodiment, the actual control output is the switching period (i.e. the reciprocal of the switching frequency).

It will be understood that, as with any control system, there is a general trade off between performance and complexity of implementation. Therefore, the system may be adjusted or controlled so that it operates under proportional only control, proportional and integral control, or proportional, integral and derivative control, depending on the requirements of the power supply.

Once the Lon time is set by the power control module, the power factor (i.e. the ratio of currents drawn off the different mains phases) may be adjusted. This power factor adjustment is made by adjusting the ratio of the M and S switching times.

The aim of power factor control is to ensure that the ratio of mains phase currents is in the same ratio as the ratio of the same mains phase voltages, or in other words that the voltage/current ratio in each phase is the same. That is, to ensure that for each phase a, b and c, Va/Ia=Vb/Ib=Vc/Ic. This is achieved by ensuring that the integral of the resonant current during the respective L, M and S periods is in the same ratio as the respective L, M and S mains phase instantaneous voltages.

The power factor of the circuit is controlled by adjusting the switching ratio of the input phases. Through the adjustment of the ratio of the M:S switching signals (Mon and Son), the power factor of the cyclo-converter circuit may be adjusted. During the sequencing of the L, M & S switching cycles, L is switched on 50% of the time based on the above Lon time calculations. The remaining 50% is shared between the M and S switching. The M:S switching ratio for this 50% portion of the switching period is adjusted to affect the proportion of current drawn from the respective M and S mains phases and hence control the power factor.

As mentioned above, it is known that for a three phase circuit (three phases=a, b and c) Va/Ia=Vb/Ib=Vc/Ic for unity power factor. Therefore, for the switching voltages and currents in a cyclo-converter to provide unity power factor it is required that:

$$Vs/Is=Vm/Im=Vl/Il$$

where Vs=Vsmall; Vm=Vmedium; Vl=Vlarge; Is=Ismall; Im=Imedium; Il=Ilarge.

Based on this equation, an error signal can be developed using the cross products of any two of the L, M and S voltage and current terms.

It will be understood that any two of the three L, M & S terms may be used to calculate a cross product. However, it has been determined that it is preferable to use the L & M terms to develop the cross product and error term. This is because the S term is a relatively small signal and therefore suffers from a low signal to noise ratio.

Therefore, taking the equation Vm/Im=Vl/Il, the error signal can be developed by forming the cross product, as follows:

$$\text{error signal}=(Vl \times Im)-(Vm \times Il)$$

Figure 6:
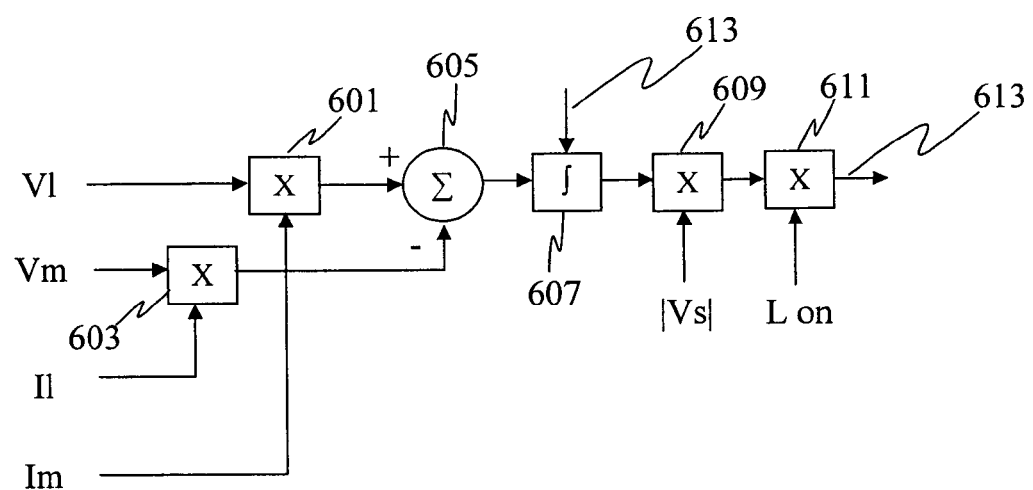
FIG. 6 shows a power factor control module according to an embodiment of the present invention.

FIG. 6 shows a representation of a circuit within the power factor module that is used to develop the cross product terms in order to produce the error signal. The circuit includes several inputs including: Vl, Vm, Vs, Il, Im and L on (the L switching signal). The Vl, Vm, Vs, Il, and Im signals are generated as described below. The L on switching signal is taken from the power control module as described above.

The Vl signal and Im signal are fed to a first multiplier 601 to produce the Vl×Im term. The Il and Vm signal are fed to a second multiplier 603 to produce the Vm×Il term. These two terms are fed to a summing device that subtracts the Vm×Il term from the Vl×Im term to develop an error term. The error term is then integrated by the integrating module 607 to develop a control parameter that is used to adjust the M:S switching ratio. The control parameter has a feed forward term applied to it through the third multiplier 609. In this embodiment, the feed forward term is the Vs signal which is developed as described below. The adjusted control parameter is then fed to a fourth multiplier 611 in order to normalise the adjusted control parameter based on the L switching period. The output 613 of the fourth multiplier is the adjusted S on time to be applied to the cyclo-converter.

The cross product error signal is taken into account at all times except where there is a magnitude cross over or zero cross over of the three phase input signal. The input signal 613 denotes a control signal being fed into the integrating module 607 identifying that the cyclo-converter is currently being operated in one of the magnitude or zero cross modes.

It is not necessary to take into account any monitored error signals developed during the Zero-cross and Magnitude-cross modes of the cyclo-converter because during these two special operational modes the power factor function is inherent. That is, during these modes it the system is not able to affect the ratio of currents drawn from the different phases, however at the same time, it is known that the currents drawn from the different phases are inherently in the correct ratio. Since the power factor control loop is unable to affect the power factor, the power factor function is disabled during the time period when these modes are active.

It will be understood that the system may continue to monitor the L and M currents during the Zero-cross and Magnitude-cross modes, however the power factor control loop integrator 607 is made inactive during these modes such that the integrator's output will not provide an integrated signal due to any error signal that might be developed during these periods. That is, the power factor control loop integrator 607 is disabled by the input control signal 613 that indicates the cyclo-converter is one of a Zero-cross and Magnitude-cross mode.

The operation of the circuit will now be described in more detail.

As discussed above, it is known that the Power Factor (PF) function is correct if the ratio of the large and medium phase currents is the same as the ratio of the large and medium phase voltages, i.e. if Vm/Im=Vl/Il. By creating an error term that is equal to [(Vl×Im)−(Vm×Il)] then this provides an instantaneous measure of respective mains phase current ratio with respect to the mains voltage ratio.

If the PF error term is +VE then this means that the M phase current is too large and the L phase current is too small.

If the PF error term is zero then this means that the ratio of the L and M phase currents is correct.

If the PF error term is −VE then this means that the L phase current is too large and the M phase current is too small.

Hence the polarity of the PF error signal indicates bias of any incorrect phase current ratio with respect to the L and M phase currents, and the magnitude of the PF error signal indicates the degree of phase current ratio imbalance.

The PF error signal is then integrated to create a control parameter that is used to affect the M:S on time ratio. Although it will be understood that the PF error term is effectively a measure of the instantaneous PF error, it has been found that the mains EMC filter has an averaging (integrating) effect such that the apparent measured PF has a somewhat "damped" response. Therefore, according to this embodiment, the control loop relies entirely on an integral only response. However, it will be understood that, as an alternative, one or more of a derivative and proportional element may also be incorporated into the control loop.

This control output from the integrator (i.e. the integral of the PF error) is then normalised by multiplying it by the |Vs| signal (absolute value of Vs). The |Vs| signal is of a similar shape to the required PF control signal, i.e. a triangular waveform. Therefore, the |Vs| signal may be used as a control feed-forward term for the PF control signal. It will be understood that in general control theory a feed-forward signal reduces the effort required by the control loop to respond to a feedback signal. According to this embodiment, the control output is the result of the feed-forward and feed-back terms, where the feed-forward term reduces the dependence on the feed-back term. This technique can significantly improve the performance of the control loop. The feed-forward term results in a high bandwidth (fast) PF control signal despite the fact that a relatively slow PF control loop integrator is also used.

Finally, the triangular profiled PF control signal is normalized by multiplying it by the L-on-time to produce a modified Son signal to control the M:S ratio. That is, as Lon is increased, Son must be increased to preserve its portion of the switching frequency period allocated to M and S switching signals.

The rationale for multiplying the triangular profiled PF control signal with the L-on time signal is due to the effect a sudden change in switching frequency may have on the M:S ratio. That is, a sudden change in the mains input voltage will result in the output voltage control loop responding to this change and rapidly changing the switching frequency. This change in switching frequency would cause a corresponding sudden change in the M:S on-time ratio if a normalisation step is not implemented. By implementing the L_on normalisation step, the M:S on-time ratio is preserved during any sudden changes in switching frequency. This approach provides improved PF control during any mains input voltage step.

The following describes how the voltage waveforms Vm and Vl signals are developed.

The Vm and Vl values are developed from the mains input phase voltages. The three input phase voltages Red, Yellow, and Blue (Va, Vb, Vc) are interpreted according to mapping rules such that Va, Vb, Vc are ranked in order of the instantaneous absolute voltage magnitude and interpreted as Vl, Vm, Vs.

Figure 7:
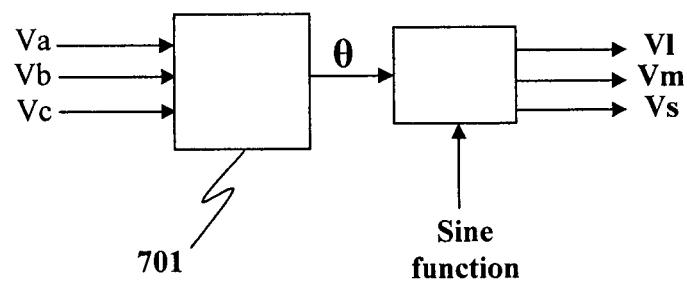
FIG. 7 shows a voltage development module according to an embodiment of the present invention.

According to this embodiment, and as shown in FIG. 7, these voltages Va, Vb & Vc are fed into a voltage development module in the form of a three phase, phase locked loop (PLL) 701.

The PLL produces a theta output (i.e. a phase measurement associated with the input phase voltage signals). The theta output is used with a trigonometric sine function to develop the Vl & Vm signals. In this way the PLL acts as a filter such that Vl and Vm are effectively filtered versions of the mains input phase voltages Va, Vb & Vc.

It will be understood that, as an alternative, the raw input voltages Va, Vb, Vc may be directly measured and used to develop the Vl, Vm & Vs signals.

To produce the Vl and Vm voltage waveforms required for the cross product circuit, the Vl, Vm and Vs signals are developed based on the measured phase angle detected by the PLL. The magnitude of the developed Vs signal is used as described above as a control feed-forward term for the PF control signal. The Vl and Vm voltage waveforms are the relative phase voltage amplitudes as the phase varies. Vl covers the normalised range from 0.866 to 1, Vm covers the normalised range from 0.5 to 0.866 (Vs covers the normalised range from 0 to 0.5). The measured phase angle (theta) is determined by the PLL monitoring the three phase inputs. By using theta and the known (i.e. generated) logical values for the L, M and S switching signals, the Vl, Vm and Vs voltage levels can be developed. The logical values for the L, M and S switching signals are Lout, Mout and Sout which are either 1 or 0 depending on whether the high, medium or low voltage stage of the cyclo-converter is being switched.

The filtering function of the PLL is therefore used to give an estimate of the Vl, Vm and Vs voltage signals without the need to measure the mains input voltage.

The following describes how the current synthesizer module synthesizes the Il and Im signals.

Synthesized large current (Il) and medium current (Im) values are produced by sampling the LLC resonant current using a high frequency gate switching signal. In any one resonant frequency cycle (running at approximately 100 kHz), the sequence switches between L, M and S voltage levels. The magnitude of the integrated current value during the L on time is equal to the magnitude of the integrated current during the L on time and also equal to magnitude of the combined integrated current during the M on time and S on time.

According to this embodiment, the current synthesizer module includes a current synthesis circuit, which is used to develop the Il and Im signals. The current synthesis circuit effectively moves the integrating function into a hardware analogue integrator (e.g. capacitor). This synthesis circuit provides an output having approximately the same detail as would be provided by a 10 MHz sampling rate of the resonant current. However, the synthesis circuit is only required to sample the output of the hardware integrator at a much lower frequency.

According to this embodiment, the sampling frequency used by the current synthesis circuit is 25 kHz. It will be understood that the sampling frequency may be higher or lower than this value.

Figure 8:
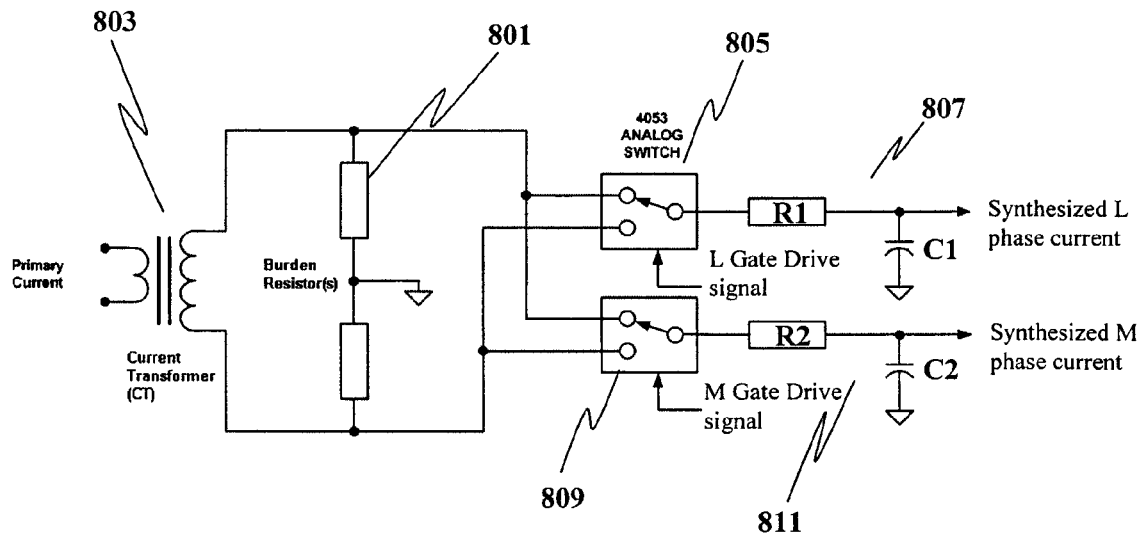
FIG. 8 shows a current synthesis circuit according to an embodiment of the present invention.

FIG. 8 shows a current synthesis circuit according to this embodiment.

The value of the integrated current during the L on time (i.e. Il) can be determined by taking samples of the resonant current while the L signal is active (i.e. by sampling the resonant current during the Lon time). The same method is then applied during the M on time to provide the average Im value during this period.

The current sensing circuit used to perform the resonant frequency sampling has a split Burden resistor 801 across a current sensing transformer (CT) 803. The current across the CT is monitored by the current synthesis circuit. The synthesis circuit consists of two parts, a first part arranged to synthesize the large current (Il) and a second part arranged to synthesize the medium current (Im).

The first part of the synthesis circuit includes a first analogue multiplexer (4053) 805 and an analogue integrator 807, which includes a resistor R1 and capacitor C1 low pass filter.

The second part of the synthesis circuit includes a second analogue multiplexer (4053) 809 and an analogue integrator 811, which also includes a resistor R2 and capacitor C2 low pass filter.

According to this embodiment, the same analogue multiplexer chip is used for both parts of the synthesis circuit, where separate channels of the multiplexer are used for each part.

Each of the two separate parts to the current synthesis circuit are fed from the one CT/burden resistor. Both parts of the synthesis circuit have the same low pass filter (integrator) characteristics. One part of the circuit synthesises the L current signal and the other part synthesises the M current signal.

A first channel of the 4053 analogue multiplexer is driven with the L gate drive signal, and a second channel of the 4053 analogue multiplexer is driven with the M gate drive signal.

The L and M gate drive signals are derived from the L and M switching signals of the cyclo-converter. The gate drive signals are inverted versions of the switching signals whenever the L (or M depending on which is being simulated) corresponding mains segment becomes negative. Therefore, the gate drive signals match the switching signals of the cyclo-converter when the corresponding mains portion is positive, but are inverted version of the switching signals when the corresponding mains portion is negative. This inversion ensures the synthesized current is always positive to enable a simplified implementation using operational amplifiers and an analogue to digital converter (ADC).

Figure 9:
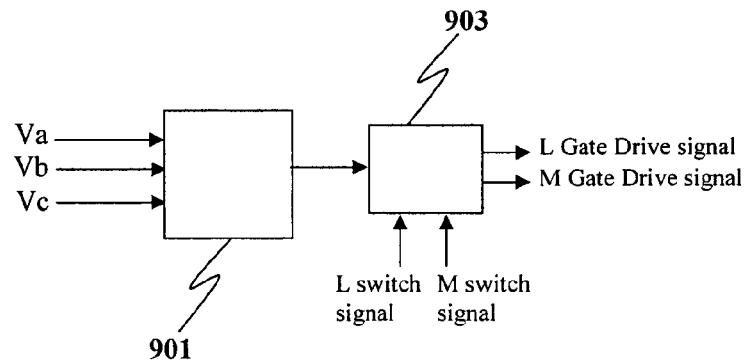
FIG. 9 shows an input phase voltage monitoring circuit according to an embodiment of the present invention.

As shown in FIG. 9, in order to detect when the mains segment is negative an input phase voltage signal monitor module 901 is used to monitor the input phase voltage signals Va, Vb & Vc and to provide an indication of whether the relevant input phase voltage signals are negative or positive. The input phase voltage signal monitor module 901 provides an output signal, which indicates the polarity of the voltage signals and feeds this to an inverter 903. the inverter 903 receives the switching signals L and M and inverts them if the output from the input phase voltage signal monitor module 901 indicates the voltages are negative for the relevant voltage signal (L or M) being switched. The switching signals L and M are not inverted by the inverter 903 if the relevant voltage signals are positive.

As explained hereinbefore, these synthesized current signals are used in the cross product control circuit to develop a modified S switching period, which is used to adjust the power factor of the cyclo-converter.

It will be understood that the embodiments of the present invention described herein are by way of example only, and that various changes and modifications may be made without departing from the scope of invention.

The invention claimed is:

1. A three-phase resonant cyclo-converter comprising a power control module, wherein the power control module is arranged to develop a plurality of repeating switching periods within a cycle of the resonant cyclo-converter, the power control module further arranged to: control the length of a first switching period in the cycle to adjust the power flow, and control the relative length of two or more further switching periods in the cycle to adjust the power factor, wherein the relative length is controlled based on a product of voltage values representing at least two mains input phase voltages and current values synthesized from resonant currents associated with at least two of the plurality of repeating switching periods.

2. The cyclo-converter of claim 1, wherein the power control module comprises a power factor control module, the power factor control module arranged to adjust a ratio of the further switching periods based on a product of derived voltage and current waveforms associated with a first and a second of three mains input phase voltage signals, the power factor control module comprising:
a voltage development module arranged to develop voltage waveforms based on the mains input phase voltage signals; and
a current synthesizer module arranged to synthesize current waveforms based on a resonant current of the cyclo-converter measured during the switching of the first and second mains input phase voltage signals.

3. The cyclo-converter of claim 2, wherein the voltage development module is further arranged to develop the voltage waveforms by measuring the mains input phase voltage signals directly.

4. The cyclo-converter of claim 2, wherein the voltage development module comprises a phase detection module which is arranged to detect a phase difference between the phases of the mains input phase voltage signals, and the voltage development module is further arranged to develop the voltage waveforms based on the detected phase difference and a trigonometric function.

5. The cyclo-converter of claim 4, wherein the detected phase difference is used to determine a phase angle that identifies the phase position of the mains input phase voltage signals.

6. The cyclo-converter of claim 2, wherein the first mains input phase voltage signal is determined by the mains input phase voltage signal that has the greatest absolute magnitude, and the second mains input phase voltage signal is determined by the mains input phase voltage signal that has a medium absolute magnitude.

7. The cyclo-converter of claim 2, wherein the power factor control module is further arranged to adjust the ratio by modifying the first switching signal using an error signal based on the product of the derived voltage and current waveforms.

8. The cyclo-converter of claim 2, wherein the first and second switching signals are used to control the switching of two of three of the mains input phase voltage signals.

9. The cyclo-converter of claim 2, wherein the current synthesizer module is arranged to feed the resonant current into a first and second integrator using first and second drive signals that are based on the switching periods.

10. The cyclo-converter of claim 9, wherein the first drive signal is based on the first switching period and the second drive signal is based on one further switching period.

11. The cyclo-converter of claim 10, wherein the cyclo-converter further comprises a mains input phase voltage signal monitor module arranged to monitor the mains input phase voltage signals, wherein the current synthesizer module is further arranged to invert the drive signals when the mains input phase voltage signals are detected by the mains input phase voltage signal monitor module as being negative.

12. The cyclo-converter of claim 9, wherein the current synthesizer module comprises a current transformer and burden resistors arranged across the current transformer to detect the resonant current on the output of the cyclo-converter.

13. The cyclo-converter of claim 2, wherein the power factor control module is arranged to detect a magnitude crossing signal or zero crossing signal and further arranged to adjust the ratio of the further switching periods when neither of the magnitude crossing signal and zero crossing signal are detected.

14. The cyclo-converter of claim 2, wherein the power factor control module determines the product by multiplying a first derived voltage waveform with a second synthesized current waveform to produce a first output, multiplying a second derived voltage waveform with a first synthesized current waveform to produce a second output, and subtracting the second output from the first output to develop an error term.

15. The cyclo-converter of claim 14, wherein the power factor control module is further arranged to integrate the error term to develop a control parameter that is used to adjust the ratio of the further switching periods.

16. The cyclo-converter of claim 15, wherein the power factor control module is further arranged to apply a feed forward signal to the control parameter to provide an adjusted control parameter.

17. The cyclo-converter of claim 16, wherein the feed forward signal is the magnitude value of a third derived voltage waveform.

18. The cyclo-converter of claim 16, wherein the power factor control module is further arranged to normalise the adjusted control parameter based on the first switching period.

19. The cyclo-converter of claim 1, wherein the cyclo-converter is a half bridge cyclo-converter.

20. A method of developing a plurality of repeating switching periods within a cycle to control a three-phase resonant cyclo-converter, the method comprising the steps of:

controlling the length of a first switching period in the cycle to adjust the power flow, and controlling the relative length of two or more further switching periods in the cycle to adjust the power factor, wherein the relative length is controlled based on a product of voltage values representing at least two mains input phase voltages and current values synthesized from resonant currents associated with at least two of the plurality of repeating switching periods.

21. The method of claim 20, further comprising the steps of adjusting a ratio of the further switching periods based on a product of derived voltage and current waveforms associated with a first and a second of three mains input phase voltage signals, developing voltage waveforms based on the mains input phase voltage signals, and synthesizing current waveforms based on a resonant current of the cyclo-converter measured during the switching of the first and second mains input phase voltage signals.

22. The method of claim 21, further comprising the step of developing the voltage waveforms by measuring the mains input phase voltage signals directly.

23. The method of claim 21, further comprising the steps of detecting a phase difference between the phases of the mains input phase voltage signals, and developing the voltage waveforms based on the detected phase difference and a trigonometric function.

24. The method of claim 23, wherein the detected phase difference is used to determine a phase angle that identifies the phase position of the mains input phase voltage signals.

25. The method of claim 21, wherein the first mains input phase voltage signal is determined by the mains input phase voltage signal that has the greatest absolute magnitude, and the second mains input phase voltage signal is determined by the mains input phase voltage signal that has a medium absolute magnitude.

26. The method of claim 21, further comprising the step of adjusting the ratio by modifying the first switching signal using an error signal based on the product of the derived voltage and current waveforms.

27. The method of claim 21, wherein the first and second switching signals are used to control the switching of two of three of the mains input phase voltage signals.

28. The method of claim 21, further comprising the step of integrating the resonant current using first and second drive signals that are based on the switching periods.

29. The method of claim 28, wherein the first drive signal is based on the first switching period and the second drive signal is based on one further switching period.

30. The method of claim 29, further comprising the steps of monitoring the mains input phase voltage signals and inverting the drive signals when the mains input phase voltage signals are detected as being negative.

31. The method of claim 28, further comprising the step of detecting the resonant current on the output of the cyclo-converter.

32. The method of claim 21, further comprising the steps of determining whether a magnitude crossing mode or zero crossing mode is active and adjusting the ratio of the further switching periods when neither of the magnitude crossing modes and zero crossing modes are active.

33. The method of claim 21, further comprising the steps of determining the product by multiplying a first derived voltage waveform with a second synthesized current waveform to produce a first output, multiplying a second derived voltage waveform with a first synthesized current waveform to produce a second output, and subtracting the second output from the first output to develop an error term.

34. The method of claim 33, further comprising the step of integrating the error term to develop a control parameter that is used to adjust the ratio of the further switching periods.

35. The method of claim 34, further comprising the step of applying a feed forward signal to the control parameter to provide an adjusted control parameter.

36. The method of claim 35, wherein the feed forward signal is the magnitude value of a third derived voltage waveform.

37. The method of claim 35, further comprising the step of normalising the adjusted control parameter based on the first switching period.

* * * * *